US012699578B2

(12) United States Patent
Jiang et al.

(10) Patent No.: US 12,699,578 B2
(45) Date of Patent: Aug. 4, 2026

(54) METHOD, APPARATUS, SYSTEM AND STORAGE MEDIUM FOR INFORMATION PROCESSING

(71) Applicant: Beijing Zitiao Network Technology Co., Ltd., Beijing (CN)

(72) Inventors: Yan Jiang, Beijing (CN); Hongye Qi, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 161 days.

(21) Appl. No.: 18/572,652

(22) PCT Filed: Aug. 29, 2022

(86) PCT No.: PCT/CN2022/115519
§ 371 (c)(1),
(2) Date: Dec. 20, 2023

(87) PCT Pub. No.: WO2023/025323
PCT Pub. Date: Mar. 2, 2023

(65) Prior Publication Data
US 2024/0289144 A1 Aug. 29, 2024

(30) Foreign Application Priority Data
Aug. 27, 2021 (CN) .......................... 202110996518.5

(51) Int. Cl.
*G06F 9/451* (2018.01)
*G06F 3/04817* (2022.01)
(Continued)

(52) U.S. Cl.
CPC .......... *G06F 9/451* (2018.02); *G06F 3/04817* (2013.01); *G06F 3/04855* (2013.01); *G06F 16/9558* (2019.01); *H04L 51/18* (2013.01)

(58) Field of Classification Search
CPC .. G06F 9/451; G06F 16/9558; G06F 3/04817; G06F 3/04855; H04L 51/18
See application file for complete search history.

(56) References Cited

U.S. PATENT DOCUMENTS 6,731,308 B1* 5/2004 Tang ..................... G06Q 10/10
715/756
6,993,660 B1* 1/2006 Libenzi ................. G06F 21/562
713/188
(Continued)

FOREIGN PATENT DOCUMENTS

CN 102098234 A 6/2011
CN 102200971 A 9/2011
(Continued)

OTHER PUBLICATIONS

Office Action issued in corresponding Chinese Application No. 202110996518.5, dated May 29, 2024, with machine translation.
(Continued)

*Primary Examiner* — Tadesse Hailu
(74) *Attorney, Agent, or Firm* — Astute IP Law Group

(57) ABSTRACT

Embodiments of the disclosure relate to a method, apparatus, system and storage medium for information processing. In at least one embodiment of the disclosure, for a message containing a link sent in an instant messaging session, a message card including a preview control is displayed in an interface of the instant messaging session, which causes the message card itself supports the preview function and enables the user to trigger the preview control in the message card, thereby displaying the preview information of a linked object of the link in response an operation triggering the preview control by an user.

19 Claims, 3 Drawing Sheets

IN RESPONSE TO SENDING A MESSAGE CONTAINING A LINK TO AN INSTANT MESSAGING SESSION, DISPLAY A MESSAGE CARD CONTAINING INFORMATION OF THE LINK IN AN INTERFACE OF THE INSTANT MESSAGING SESSION, THE MESSAGE CARD INCLUDING A PREVIEW CONTROL 101

IN RESPONSE TO AN OPERATION TRIGGERING THE PREVIEW CONTROL, DISPLAY PREVIEW INFORMATION OF A LINKED OBJECT OF THE LINK 102

(51) Int. Cl.
  *G06F 3/04855* (2022.01)
  *G06F 16/955* (2019.01)
  *H04L 51/18* (2022.01)

(56) References Cited

U.S. PATENT DOCUMENTS

| | | | | |
|---|---|---|---|---|
| 8,296,654 | B2 * | 10/2012 | Ahlberg | G06F 9/451 |
| | | | | 715/771 |
| 9,913,114 | B1 * | 3/2018 | Wu | G06T 11/60 |
| 10,185,931 | B2 * | 1/2019 | O'Shaugnessy | H04L 51/04 |
| 10,749,831 | B2 * | 8/2020 | Zhong | H04L 51/08 |
| 11,595,437 | B1 * | 2/2023 | Mushtaq | H04L 63/20 |
| 11,687,648 | B2 * | 6/2023 | Lee | H04L 63/1416 |
| | | | | 726/23 |
| 12,160,401 | B2 * | 12/2024 | Brandt | G06F 16/176 |
| 2002/0101446 | A1 * | 8/2002 | Tang | G06Q 10/10 |
| | | | | 715/751 |
| 2004/0236749 | A1 * | 11/2004 | Cortright | G06Q 10/107 |
| | | | | 707/999.009 |
| 2006/0128404 | A1 * | 6/2006 | Klassen | H04M 1/72436 |
| | | | | 455/466 |
| 2010/0042684 | A1 * | 2/2010 | Broms | G06F 3/0483 |
| | | | | 715/764 |
| 2015/0193389 | A1 * | 7/2015 | Rose | G06F 16/9558 |
| | | | | 715/208 |
| 2017/0230320 | A1 * | 8/2017 | Knight | H04L 51/10 |
| 2018/0091453 | A1 * | 3/2018 | Jakobsson | H04L 63/1483 |
| 2019/0124177 | A1 * | 4/2019 | Garg | H04L 67/306 |
| 2019/0213325 | A1 * | 7/2019 | McKerchar | G06F 21/51 |
| 2020/0065307 | A1 * | 2/2020 | Roy | G06F 16/24575 |
| 2020/0137110 | A1 * | 4/2020 | Tyler | H04L 63/1483 |
| 2020/0145458 | A1 * | 5/2020 | Kumar | H04L 63/145 |

FOREIGN PATENT DOCUMENTS

| | | |
|---|---|---|
| CN | 102946345 A | 2/2013 |
| CN | 104243273 A | 12/2014 |
| CN | 105793840 A | 7/2016 |
| CN | 106254216 A | 12/2016 |
| CN | 106254217 A | 12/2016 |
| CN | 107066174 A | 8/2017 |
| CN | 107959615 A | 4/2018 |
| CN | 108965737 A | 12/2018 |
| CN | 109033822 A | 12/2018 |
| CN | 109814774 A | 5/2019 |
| CN | 110011895 A | 7/2019 |
| CN | 111460180 A | 7/2020 |
| CN | 112052415 A | 12/2020 |
| CN | 112286608 A | 1/2021 |
| WO | 2019021048 A1 | 1/2019 |

OTHER PUBLICATIONS

International Search Report (with English translation) and Written Opinion issued in PCT/CN2022/115519, dated Nov. 28, 2022, 11 pages provided.

Decision of Rejection for Chinese Patent Application No. 202110996518.5, mailed on Oct. 22, 2024, 12 pages.

* cited by examiner

IN RESPONSE TO SENDING A MESSAGE CONTAINING A LINK TO AN INSTANT MESSAGING SESSION, DISPLAY A MESSAGE CARD CONTAINING INFORMATION OF THE LINK IN AN INTERFACE OF THE INSTANT MESSAGING SESSION, THE MESSAGE CARD INCLUDING A PREVIEW CONTROL — 101

IN RESPONSE TO AN OPERATION TRIGGERING THE PREVIEW CONTROL, DISPLAY PREVIEW INFORMATION OF A LINKED OBJECT OF THE LINK — 102

METHOD, APPARATUS, SYSTEM AND STORAGE MEDIUM FOR INFORMATION PROCESSING

CROSS REFERENCE

The present application claims priority to Chinese Patent Application No. 202110996518.5, filed on Aug. 27, 2021 and entitled "Method, apparatus, system and storage medium for information displaying", the entirety of which is incorporated herein by reference.

FIELD

Embodiments of the present disclosure relates to the field of instant messaging technology, specifically to a method, apparatus, system, and storage medium for information processing.

BACKGROUND

At present, in different instant messaging (IM) tools, for text-based external links (Uniform Resource Locator, URL) sent in instant messaging sessions, such as official account links, news webpage links, etc., a URL is usually directly displayed in the interface of instant messaging sessions, or the title or part of the link content is displayed while displaying the URL.

Users can only see the title or part of the link content before clicking on the URL to skip to the body text. To learn more content, users need to click on the URL or click on the title to skip to the original page linked by the URL to view the body text. When the displayed title or part of the link content does not attract the user's attention, the user may not view the body text through tedious operations such as clicking on the URL or clicking on the title.

SUMMARY

In order to solve at least one problem of prior art, at least one embodiment of the present disclosure provides a method, apparatus, system, and storage medium for information processing.

In a first aspect, embodiments of the present disclosure provide a method for information processing, including:

in response to sending a message containing a link to an instant messaging session, displaying a message card containing information of the link in an interface of the instant messaging session, the message card including a preview control; and in response to an operation triggering the preview control, displaying preview information of a linked object of the link.

In some embodiments, the preview control is a first preview control or a second preview control;

the in response to an operation triggering the preview control, displaying preview information of a linked object of the link includes:

in response to an operation triggering the first preview control, displaying the preview information in the message card in the interface of the instant messaging session; or, in response to an operation triggering the second preview control, popping up a layer in the interface of the instant messaging session and displaying the preview information in the popped-up layer.

In some embodiments, the first preview control is a scroll bar control in the message card; the in response to an operation triggering the first preview control, displaying the preview information in the message card in the interface of the instant messaging session includes: in response to a sliding operation of the scroll bar control, scrolling and displaying part of information of the preview information in the message card in the interface of the instant messaging session; or the first preview control is a view more control in the message card; the in response to an operation triggering the first preview control, displaying the preview information in the message card in the interface of the instant messaging session includes: in response to an operation triggering the view more control, displaying all information of the preview information in the message card in the interface of the instant messaging session.

In some embodiments, the in response to an operation triggering the second preview control, popping up a layer in the interface of the instant messaging session and displaying the preview information in the popped-up layer includes:

in response to the operation triggering the second preview control, popping up the layer in the interface of the instant messaging session, and adding a scroll bar control or a view more control to the popped-up layer, and in response to a sliding operation of the scroll bar control, scrolling and displaying part of information of the preview information in the popped-up layer, or in response to an operation triggering the view more control, displaying all information of the preview information in the popped-up layer.

In some embodiments, the message card further includes at least one of the following controls: a first storage control or a copy link control;

the first storage control is used to cut and store the preview information of the linked object or all information of the linked object; and the copy link control is used to copy the link.

In some embodiments, the information of the link contained in the message card includes at least one of the following:

an icon which is a logo pattern of a webpage corresponding to the link.

a hyperlink which opens a browser after being triggered and skipping to the webpage corresponding to the link; or a label for identifying a type of the webpage corresponding to the link.

In some embodiments, before displaying the message card containing the information of the link in the interface of the instant messaging session, the method further includes:

parsing the link to obtain information of the link; and rendering the message card including the information of link and the preview control.

In some embodiments, before displaying the message card containing the information of the link in the interface of the instant messaging session, the method further includes:

deciding whether the link is a text link; and if a result of the decision is yes, performing an act of displaying the message card containing the information of the link in the interface of the instant messaging session.

In some embodiments, the method further includes:

pushing a link preview event to a service end of the link;

receiving preview information fed back by the service end in response to the link preview event; and in response to the operation triggering the preview control, displaying the preview information in the interface of the instant messaging session.

In a second aspect, embodiments of the present disclosure further propose an apparatus for information processing, including:

a displaying unit configured for in response to sending a message containing a link to an instant messaging session, displaying a message card containing information of the link in an interface of the instant messaging session, the message card including a preview control; and a showing unit configured for in response to an operation triggering the preview control, displaying preview information of a linked object of the link.

In a third aspect, embodiments of the present disclosure further propose a system including at least one computing device and at least one storage device storing an instruction, wherein the instruction, when executed by the at least one computing device, cause the at least one computing device to perform acts of the method for information processing of any of embodiments of the first aspect.

In a fourth aspect, embodiments of the present disclosure further propose a computer-readable storage medium storing a program or an instruction that, when executed by at least one computing device, cause the at least one computing device to perform acts of the method for information processing of any of embodiments of the first aspect.

It can be seen that in at least one embodiment of the present disclosure, for a message containing a link sent in an instant messaging session, a message card including a preview control is displayed in the interface of the instant messaging session, so that the message card itself supports the preview function, and then the user can trigger the preview control in the message card, thereby in response to an operation triggering the preview control by the user, displaying the preview information of a linked object of the link. It can be seen that if the user wants to learn more content, the user can view the preview information by triggering the preview control, without clicking on the link or title to skip to the body text for viewing, making it more convenient for the user to learn more content. Even if the title or part of the content of the link does not attract the user's attention, due to the existence of the preview control, the user may trigger the preview control to view the preview information and increase the exposure of the content of the link.

BRIEF DESCRIPTION OF THE DRAWINGS

In order to more clearly illustrate the technical solution of embodiments of the present disclosure, in the following, the drawings that need to be used in the description of the embodiments or the prior art will be introduced briefly. Obviously, the drawings described below are only some embodiments of the present disclosure, and ordinary technicians in this field can also obtain other drawings based on these drawings.

DETAILED DESCRIPTION

Figure 1:
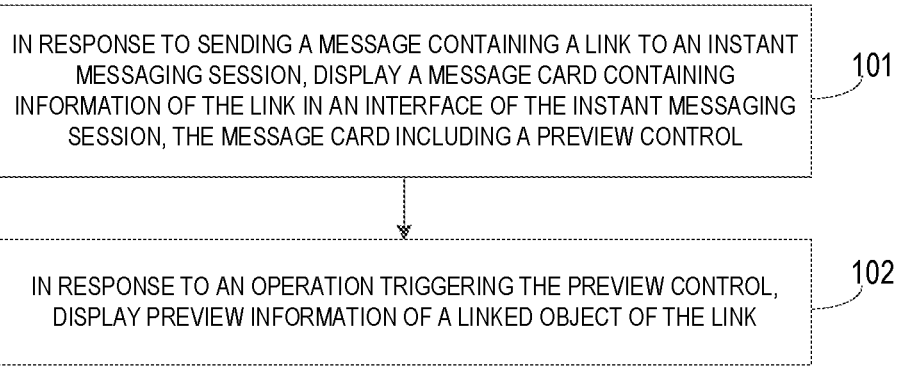
FIG. 1 is an example flowchart of a method for information processing provided by an embodiment of the present disclosure.

In order to better understand the above purposes, features, and advantages of the present disclosure, the following detailed description of the present disclosure is made in conjunction with the accompanying drawings and embodiments. It can be understood that the described embodiments are part of the embodiments of the present disclosure, not all of them. The specific embodiments described herein are only used to explain the present disclosure, not to limit it. Based on the described embodiments of the present disclosure, all other embodiments obtained by those skilled in the art are within the scope of protection of the present disclosure.

It should be noted that in this article, relational terms such as "first" and "second" are only used to distinguish one entity or operation from another entity or operation, and do not necessarily require or imply any actual relationship or order between these entities or operations.

Text links refer to links mainly with text content (Uniform Resource Locator, URL), such as links to content platforms, forum links, official account links, news webpage links, etc. Currently, in different instant messaging tools, there are different ways to handle text external links sent in instant messaging sessions, such as:

In some instant messaging tools, the URL is directly displayed, and users can click on the URL to skip to the original page linked by the URL for viewing. In some instant messaging tools, message cards including the URL can be rendered, which can provide partial content of link. Moreover, the message card itself does not support click-to-skip. If users want to learn more content, they can only skip to the body text by clicking on the URL for viewing. In some instant messaging tools, the URL can be parsed to obtain the title, and a message card including the URL and title can be rendered. Moreover, the message card itself does not support click-to-skip, and users can click on the URL or title to skip to the body text for viewing.

Embodiments of the present disclosure provide a method, apparatus, system, and storage medium for information processing. For a message containing a link sent in an instant messaging session, a message card including a preview control is displayed in the interface of the instant messaging session, so that the message card itself supports preview function, and then the user can trigger the preview control in the message card, thereby in response to an operation triggering the preview control by the user, displaying the preview information of the linked object of the link. It can be seen that if the user wants to learn more content, the user can view the preview information by triggering the preview control, without clicking on the link or title to skip to the body text for viewing, making it more convenient for the user to learn more content. Even if the title or part of the content of the link does not attract the user's attention, due to the existence of the preview control, the user may trigger the preview control to view the preview information and increase the exposure of the content of the link.

FIG. 1 is an example flowchart of a method for information processing provided by an embodiment of the present disclosure. The method for information processing may include but is not limited to the following steps 101 and 102:

101, in response to sending a message containing a link to an instant messaging session, display a message card containing information of the link in an interface of the instant messaging session, the message card including a preview control.

The link is a text link, that is, the content of the link is mainly text (Uniform Resource Locator, URL), such as links to content platforms, forum links, official account links, news web links, etc.

102, in response to an operation triggering the preview control, display preview information of a linked object of the link. The linked object is a webpage corresponding to the link.

In some embodiments, the preview control is a first preview control or a second preview control. In response to an operation triggering the first preview control, displaying the preview information in the message card in the interface of the instant messaging session. It can be seen that for the first preview control, the preview will not leave the interface of the instant messaging session, that is, it does not need to skip to the original page of the link. Users do not need to click on the link or title to skip to the body text to view; making it more convenient for users to learn more content. Even if the title or part of content of the link does not attract the user's attention, due to the existence of the first preview control, the user may still trigger the first preview control to view the preview information and increase the exposure of the content of the link.

In some embodiments, the first preview control is a scroll bar control in the message card. In response to a sliding operation of the scroll bar control, scroll and display part of information of the preview information in the message card in the interface of the instant messaging session.

In some embodiments, the first preview control is a view more control in the message card, such as a "view more" button. In response to an operation triggering the view more control, display all information of the preview information in the message card in the interface of the instant messaging session.

In some embodiments, the preview control is a second preview control. In response to an operation triggering the second preview control, pop up a layer in the interface of the instant messaging session and display the preview information in the popped-up layer. It can be seen that for the second preview control, the preview will not leave the interface of the instant messaging session, that is, it does not need to skip to the original page of the link. Users do not need to click on the link or title to skip to the body text to view; making it more convenient for users to learn more content. Even if the title or part of the content of link does not attract the user's attention, due to the existence of the second preview control, the user may trigger the second preview control to view the preview information and increase the exposure of the content of the link.

In some embodiments, the second preview control is a "preview" button. In response to a click operation of the "preview" button, pop up a layer in the interface of the instant messaging session, such as a popped-up overlay, and a scroll bar control or a view more control is added to the popped-up layer. In response to a sliding operation of the scroll bar control, scroll and display part of information of the preview information in the popped-up layer, or in response to an operation triggering the view more control, display all information of the preview information in the popped-up layer. In addition, a close control is added to the popped-up layer, such as a "close" button, and in response to a click operation of the "close" button, the popped-up layer is closed.

In some embodiments, the message card also includes a first storage control and/or a copy link control. The first storage control is used to cut and store the preview information of the link object or all the information of the link object; the copy link control is used to copy the link.

In some embodiments, before displaying the message card containing the information of the link in the interface of the instant messaging session, the method may further includes: parse the link to obtain information of the link; render the message card including the information of link and the preview control. When rendering the message card, the general height of the message card can be limited, and the general height can be set according to actual needs, and this embodiment does not limit the specific value.

In some embodiments, the information of the link contained in the message card includes at least one of the following: an icon, a hyperlink, or a label. The icon is a logo pattern of a webpage corresponding to the link; the hyperlink is a text hyperlink, and the hyperlink opens a browser after being triggered and skipping to the webpage corresponding to the link; the label is used to identify a type of the webpage corresponding to the link.

For example, if the webpage corresponding to the link is a text document, the icon is the logo pattern of the text document, the hyperlink is the theme of the text document, and the label is the identifier of the text document.

In some embodiments, hyperlinks can be constructed based on themes or summaries extracted from pages corresponding to the links, or hyperlinks can be constructed based on text customized by business parties. It can be seen that the hyperlink seen by users is a text hyperlink, which makes it easier to understand the content summary of the webpage corresponding to the hyperlink.

In some embodiments, the icon is located before the hyperlink as the head of the hyperlink, and the label is located after the hyperlink as the tail of the hyperlink, so that the icon, hyperlink, and label can be seen as a whole as the result of link resolution. It can be seen that one of the differences from existing message cards is that the message card in this embodiment includes the result of link resolution, not the link itself.

In one embodiment of the present disclosure, the method for information processing is performed by the IM Client in cooperation with the URL middle platform, where the URL middle platform can be understood as a service middle platform in the IM system that handles URL-related matters. The URL middle platform obtains user input through the IM Client and displays the processing results of the URL to the client through the IM Client.

Figure 2:
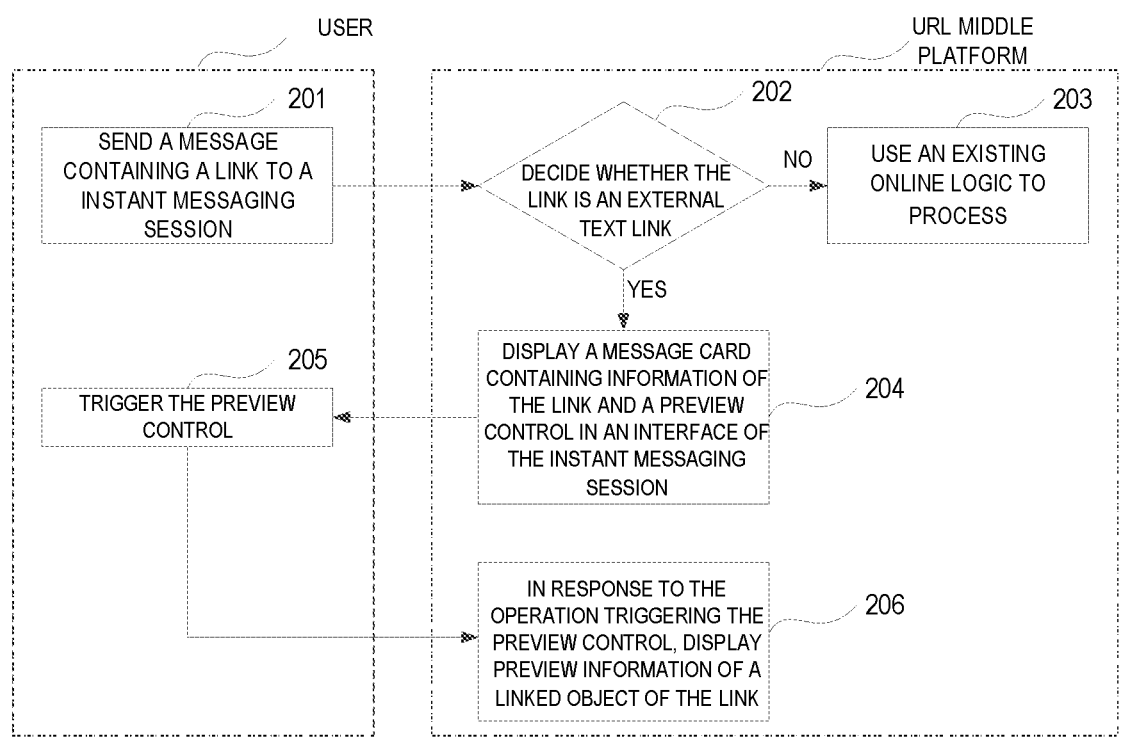
FIG. 2 is an example flowchart of another method for information processing provided by an embodiment of the present disclosure.

FIG. 2 is an example flowchart of another method for information processing provided by an embodiment of the present disclosure, the method for information processing includes steps 201 to 206:

At step 201, a user sends a message containing a link to the instant messaging session.

At step 202, the URL middle platform, in response to sending the message containing the link to the instant messaging session, decides whether the link is an external text link. The external text links are mainly text-based links, such as links to content platforms, forum links, official account links, news webpage links, etc.; external links can be understood as links external to IM tools.

At step 203, if the URL middle platform decides that the link is not an external text link, the existing online logic is used to process the link, and there can be multiple online logics. The current online logic is to directly display the link in the interface of the instant messaging session, and other online logics will not be elaborated.

At step 204, if the URL platform decides that the link is an external text link, in response to sending the message containing the link to the instant messaging session, it displays the message card containing information of the link and the preview control in the interface of the instant messaging session.

At step 205, the user can trigger the preview control.

If the preview control is a scroll bar control in the message card, the user can slide the scroll bar control; if the preview control is a "view more" button, the user can click the button; if the preview control is the "preview" button, the user can click the button.

At step 206, the URL middle platform, in response to the operation triggering the preview control, displays the preview information of the linked object of the link.

The URL middle platform, in response to the sliding operation of the scroll bar control, scrolls and displays part of information of the preview information in the message card in the interface of the instant messaging session.

The URL middle platform, in response to the click operation of the "view more" button, displays all information of the preview information in the message card in the interface of the instant messaging session.

The URL middle platform, in response to the click operation of the "preview" button, pops up a layer, such as a popped-up overlay, in the interface of the instant messaging session, and adds a scroll bar control or a view more control to the popped-up layer. In response to the sliding operation of the scroll bar control, the URL middle platform scrolls and displays part of information of the preview information in the popped-up layer, or in response to the operation triggering the view more control, it displays all information of the preview information in the popped-up layer.

Figure 3:
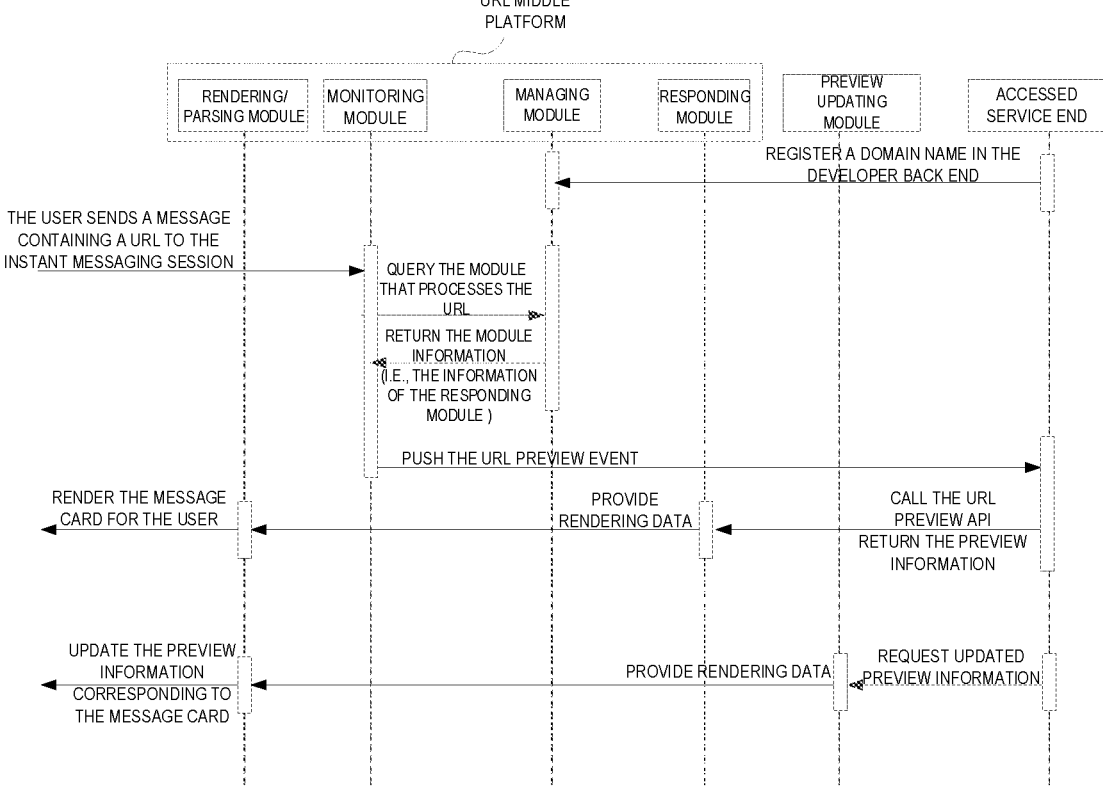
FIG. 3 is an example flowchart of yet another method for information processing provided by an embodiment of the present disclosure.

FIG. 3 is an example flowchart of yet another method for information processing provided by an embodiment of the present disclosure. The execution body of the method for information processing is the URL middle platform. Furthermore, the URL middle platform is divided into multiple functional modules: a rendering/parsing module, a monitoring module, a management module, and a responding module. In FIG. 3, the service end needs to register a domain name in the developer back end firstly in order to access the management module of the URL middle platform. The flow of the method for information processing is described as follows:

The user sends a message containing a URL to the instant messaging session. After listening to the message containing the URL, the monitoring module queries the management module for the module that processes the URL. The management module returns the queried module information (i.e., the information of the responding module) to the monitoring module. The monitoring module pushes the URL preview event to the service end of the URL. The service end responds to the URL preview event, calls the URL preview API (Application Programming Interface) to obtain the preview information, and sends the preview information to the responding module. The responding module receives the preview information fed back by the service end in response to the URL preview event, and provides rendering data to the rendering/parsing module, the rendering data including but not limited to the height of the message card, etc. After obtaining the rendering data, the rendering/parsing module parses the URL, obtains the information of the link, and renders the message card including the URL and the preview control for the user.

In addition, the accessed service end can also request update preview information from a preview update module and send new preview information to the preview update module while requesting update preview information. The preview update module generates rendering data based on the new preview information and sends the rendering data to the rendering/parsing module. After obtaining the rendering data, the rendering/parsing module updates the preview information corresponding to the message card.

It should be noted that for respective above-mentioned method embodiments, they are all described as a series of action combinations for simplicity. However, those skilled in the art can understand that embodiments of the present disclosure are not limited by the action sequence described, because according to the embodiments of the present disclosure, some steps can be performed in other sequences or simultaneously. In addition, those skilled in the art can understand that the embodiments described in the specification are all optional embodiments.

Figure 4:
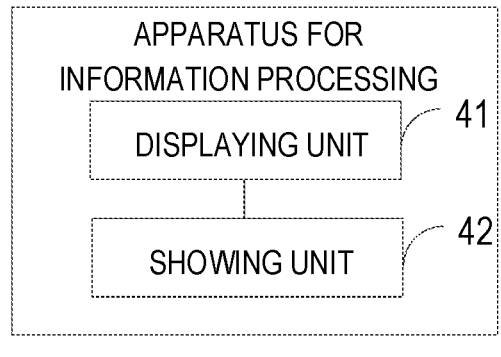
FIG. 4 is an example block diagram of an apparatus for information processing provided by an embodiment of the present disclosure.

FIG. 4 is an apparatus for information processing provided by an embodiment of the present disclosure, the apparatus for information processing includes but is not limited to: a displaying unit 41 and a showing unit 42.

The displaying unit 41 configured for in response to sending a message containing a link to an instant messaging session, displaying a message card containing information of the link in an interface of the instant messaging session, the message card including a preview control.

The showing unit 42 configured for in response to an operation triggering the preview control, displaying preview information of a linked object of the link.

In some embodiments, the preview control is a first preview control or a second preview control.

The showing unit 42 is configured for in response to an operation triggering the first preview control, displaying the preview information in the message card in the interface of the instant messaging session; or, the showing unit 42 is configured for in response to an operation triggering the second preview control, popping up a layer in the interface of the instant messaging session and displaying the preview information in the popped-up layer.

In some embodiments, the first preview control is a scroll bar control in the message card; the showing unit 42 is configured for in response to a sliding operation of the scroll bar control, scrolling and displaying part of information of the preview information in the message card in the interface of the instant messaging session.

In some embodiments, the first preview control is a view more control in the message card; the showing unit 42 is configured for in response to an operation triggering the view more control, displaying all information of the preview information in the message card in the interface of the instant messaging session.

In some embodiments, the showing unit 42 is configured for in response to the operation triggering the second preview control, popping up the layer in the interface of the instant messaging session, and adding a scroll bar control or a view more control to the popped-up layer, and in response to a sliding operation of the scroll bar control, scrolling and displaying part of information of the preview information in the popped-up layer, or in response to an operation triggering the view more control, displaying all information of the preview information in the popped-up layer.

In some embodiments, the message card also includes a first storage control and/or a copy link control; the first storage control is used to cut and store the preview information of the link object or all information of the link object; the copy link control is used to copy the link.

In some embodiments, the information of the link contained in the message card includes at least one of the following:

an icon which is a logo pattern of a webpage corresponding to the link;

a hyperlink which opens a browser after being triggered and skipping to the webpage corresponding to the link; or a label for identifying a type of the webpage corresponding to the link.

In some embodiments, the apparatus for information processing further includes a parsing/rendering unit, configured for parsing the link to obtain information of the link; and rendering the message card including the information of link and the preview control.

In some embodiments, the apparatus for information processing further includes a deciding unit, configured for deciding whether the link is a text link. The displaying unit 41 is configured for, if a result of the decision is yes, performing an act of displaying the message card containing the information of the link in the interface of the instant messaging session.

In some embodiments, the apparatus for information processing further includes a preview information obtaining unit, configured for pushing a link preview event to a service end of the link, and receiving preview information fed back by the service end in response to the link preview event.

In some embodiments, the division of each unit in the apparatus for information processing is only a logical functional division, and there can be other division manners in actual implementation. For example, at least two units in the apparatus for information processing can be implemented as one unit; each unit in the apparatus for information processing can also be divided into multiple sub-units. It can be understood that each unit or sub-unit can be implemented by electronic hardware, or a combination of computer software and electronic hardware. Whether these functions are performed in hardware or software depends on the specific application and design constraints of the technical solution. Those skilled in the art can use different methods for each specific application to achieve the described functions.

Figure 5:
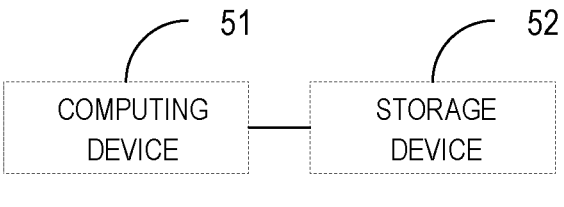
FIG. 5 is an example block diagram of a system including at least one computing device and at least one storage device storing an instruction provided by an embodiment of the present disclosure.

FIG. 5 is an example block diagram of a system including at least one computing device and at least one storage device storing an instruction provided by an embodiment of the disclosure. In some embodiments, the system may be used for big data processing, and the at least one computing device and at least one storage device may be deployed distributedly, making the system a distributed data processing cluster.

As shown in FIG. 5, the system includes: at least one computing device 51, and at least one storage device 52 that stores an instruction. It can be understood that the storage device 52 in this embodiment can be a volatile memory or a non-volatile memory, or can include both volatile and non-volatile memories.

In some embodiments, storage device 52 stores the following elements, executable units or data structures, or subsets of them, or extended sets of them: operating systems and application programs.

The operating system includes various system programs, such as framework layer, core library layer, driver layer, etc., for implementing various basic tasks and processing hardware-based tasks. The application program includes various application programs, such as media player, browser, etc. for implementing various application tasks. A program that implements the method for information processing provided by an embodiment of the present disclosure may be included in the application program.

In embodiments of the present disclosure, at least one computing device 51 is used to execute the acts of each embodiment of the method for information processing provided by an embodiment of the present disclosure by calling a program or instruction stored in at least one storage device 52, specifically, a program or instruction stored in an application program.

The method for information processing provided by an embodiment of the present disclosure can be applied to the computing device 51 or implemented by the computing device 51. The computing device 51 can be an integrated circuit chip with signal processing capability. In the implementation process, each act of the above method can be completed by hardware integrated logic circuits or software instructions in the computing device 51. The computing device 51 can be a general-purpose processor, digital signal processor (DSP), application-specific integrated circuit (ASIC), field programmable gate array (FPGA) or other programmable logic devices, discrete gate or transistor logic devices, discrete hardware components. The general-purpose processor can be a microprocessor or the processor can also be any conventional processor, etc.

The acts of the method for information processing provided by an embodiment of the present disclosure can be processed by hardware decoding processors or mixture of hardware and software in decoding processors. The software unit can be located in random access memory, flash memory, read-only memory, programmable read-only memory, or electrically erasable programmable memory, registers, and other mature storage media in the art. The storage medium is located in the storage device 52, and the computing device 51 reads the information in the storage device 52 and combines its hardware complete the acts of the method.

An embodiment of the present disclosure also proposes a computer-readable storage medium, and the computer-readable storage medium stores programs or instructions that, when executed by at least one computing device, cause at least one computing device to perform the acts of various embodiments of the method for information processing, and to avoid repeated description, which is not elaborated herein. The computing device may be the computing device 51 shown in FIG. 5. In some embodiments, the computer-readable storage medium is a non-transitory computer-readable storage medium.

An embodiment of the present disclosure also proposes a computer program product, and the computer program product includes a computer program stored in a non-transient computer-readable storage medium, and at least one processor of the computer reads and executes the computer program from the storage medium, causing the computer to perform the acts of various embodiments of the method for information processing. To avoid repeated description, it will not be repeated here.

It should be noted that in this article, the terms "comprising", "including", or any other variation thereof are intended to cover non-exclusive inclusion, so that a process, method, article, or apparatus that includes a series of elements not only includes those elements, but also includes other elements not explicitly listed, or includes elements inherent to such a process, method, article, or device. Without further restrictions, the elements defined by the phrase "including .

11

. . " do not exclude the existence of other identical elements in the process, method, article, or apparatus that includes the element.

Technical personnel in this field can understand that although some of the embodiments described herein include certain features included in other embodiments rather than other features, the combination of features of different embodiments means that they are within the scope of the present disclosure and form different embodiments.

Technical personnel in this field can understand that the description of each implementation example has its own emphasis, and the parts that are not described in detail in a certain implementation example can refer to the relevant descriptions of other implementation examples.

Although the embodiments of the present disclosure are described in conjunction with the accompanying drawings, those skilled in the art can make various modifications and variations without departing from the spirit and scope of the present disclosure, and such modifications and variations fall within the scope defined by the appended claims.

We claim:

1. A method for information processing, the method comprising:

in response to sending a message containing a link to an instant messaging session, parsing the link to obtain information of the link;

displaying a message card containing the information of the link in an interface of the instant messaging session, the message card comprising a preview control; and in response to an operation triggering the preview control, displaying preview information of a linked object of the link without leaving the interface of the instant messaging session, wherein the linked object comprising a webpage corresponding to the link, the preview information comprising a portion of or all of information of the webpage corresponding to the link, the information of the link contained in the message card comprises an access portal constructed based on themes or summaries extracted from the webpage corresponding to the link.

2. The method of claim 1, wherein the preview control is a first preview control or a second preview control;

the in response to an operation triggering the preview control, displaying preview information of a linked object of the link comprises:

in response to an operation triggering the first preview control, displaying the preview information in the message card in the interface of the instant messaging session; or, in response to an operation triggering the second preview control, popping up a layer in the interface of the instant messaging session and displaying the preview information in the popped-up layer.

3. The method of claim 2, wherein, the first preview control is a scroll bar control in the message card; the in response to an operation triggering the first preview control, displaying the preview information in the message card in the interface of the instant messaging session comprises: in response to a sliding operation of the scroll bar control, scrolling and displaying part of information of the preview information in the message card in the interface of the instant messaging session; or the first preview control is a view more control in the message card; the in response to an operation triggering the first preview control, displaying the preview information in the message card in the interface of the instant messaging session comprises: in response to an operation triggering the view more control, displaying all information of the preview information in the message card in the interface of the instant messaging session.

4. The method of claim 2, wherein the in response to an operation triggering the second preview control, popping up a layer in the interface of the instant messaging session and displaying the preview information in the popped-up layer comprises:

in response to the operation triggering the second preview control, popping up the layer in the interface of the instant messaging session, and adding a scroll bar control or a view more control to the popped-up layer, and in response to a sliding operation of the scroll bar control, scrolling and displaying part of information of the preview information in the popped-up layer, or in response to an operation triggering the view more control, displaying all information of the preview information in the popped-up layer.

5. The method of claim 1, wherein the message card further comprises at least one of the following controls: a first storage control or a copy link control;

the first storage control is used to cut and store the preview information of the linked object or all information of the linked object; and the copy link control is used to copy the link.

6. The method of claim 1, wherein the information of the link contained in the message card comprises at least one of the following:

an icon which is a logo pattern of a webpage corresponding to the link;

a hyperlink which opens a browser after being triggered and skipping to the webpage corresponding to the link; or a label for identifying a type of the webpage corresponding to the link.

7. The method of claim 6, wherein before displaying the message card containing the information of the link in the interface of the instant messaging session, the method further comprises:

rendering the message card comprising the information of link and the preview control.

8. The method of claim 1, wherein, before displaying the message card containing the information of the link in the interface of the instant messaging session, the method further comprises: deciding whether the link is a text link; and if a result of the decision is yes, performing an act of displaying the message card containing the information of the link in the interface of the instant messaging session.

9. The method of claim 1, wherein the method further comprises:

pushing a link preview event to a service end of the link;

receiving preview information fed back by the service end in response to the link preview event; and in response to the operation triggering the preview control, displaying the preview information in the interface of the instant messaging session.

10. A system comprising at least one computing device and at least one storage device storing an instruction, wherein the instruction, when executed by the at least one computing device, causes the at least one computing device to perform a method comprising:

in response to sending a message containing a link to an instant messaging session, parsing the link to obtain information of the link;

displaying a message card containing the information of the link in an interface of the instant messaging session, the message card comprising a preview control; and in response to an operation triggering the preview control, displaying preview information of a linked object of the link without leaving the interface of the instant messaging session, wherein the linked object comprising a webpage corresponding to the link, the preview information comprising a portion of or all of information of the webpage corresponding to the link, the information of the link contained in the message card comprises an access portal constructed based on themes or summaries extracted from the webpage corresponding to the link.

11. The system of claim 10, wherein the preview control is a first preview control or a second preview control;

the in response to an operation triggering the preview control, displaying preview information of a linked object of the link comprises:

in response to an operation triggering the first preview control, displaying the preview information in the message card in the interface of the instant messaging session; or, in response to an operation triggering the second preview control, popping up a layer in the interface of the instant messaging session and displaying the preview information in the popped-up layer.

12. The system of claim 11, wherein, the first preview control is a scroll bar control in the message card; the in response to an operation triggering the first preview control, displaying the preview information in the message card in the interface of the instant messaging session comprises: in response to a sliding operation of the scroll bar control, scrolling and displaying part of information of the preview information in the message card in the interface of the instant messaging session; or the first preview control is a view more control in the message card; the in response to an operation triggering the first preview control, displaying the preview information in the message card in the interface of the instant messaging session comprises: in response to an operation triggering the view more control, displaying all information of the preview information in the message card in the interface of the instant messaging session.

13. The system of claim 11, wherein the in response to an operation triggering the second preview control, popping up a layer in the interface of the instant messaging session and displaying the preview information in the popped-up layer comprises:

in response to the operation triggering the second preview control, popping up the layer in the interface of the instant messaging session, and adding a scroll bar control or a view more control to the popped-up layer, and in response to a sliding operation of the scroll bar control, scrolling and displaying part of information of the preview information in the popped-up layer, or in response to an operation triggering the view more control, displaying all information of the preview information in the popped-up layer.

14. The system of claim 10, wherein the message card further comprises at least one of the following controls: a first storage control or a copy link control;

the first storage control is used to cut and store the preview information of the linked object or all information of the linked object; and the copy link control is used to copy the link.

15. The system of claim 10, wherein the information of the link contained in the message card comprises at least one of the following:

an icon which is a logo pattern of a webpage corresponding to the link;

a hyperlink which opens a browser after being triggered and skipping to the webpage corresponding to the link; or a label for identifying a type of the webpage corresponding to the link.

16. The system of claim 15, wherein before displaying the message card containing the information of the link in the interface of the instant messaging session, the method further comprises:

rendering the message card comprising the information of link and the preview control.

17. The system of claim 10, wherein, before displaying the message card containing the information of the link in the interface of the instant messaging session, the method further comprises: deciding whether the link is a text link; and if a result of the decision is yes, performing an act of displaying the message card containing the information of the link in the interface of the instant messaging session.

18. The system of claim 10, wherein the method further comprises:

pushing a link preview event to a service end of the link;

receiving preview information fed back by the service end in response to the link preview event; and in response to the operation triggering the preview control, displaying the preview information in the interface of the instant messaging session.

19. A non-transitory computer-readable storage medium storing a program or an instruction that, when executed by at least one computing device, causes the at least one computing device to perform a method comprising:

in response to sending a message containing a link to an instant messaging session, parsing the link to obtain information of the link;

displaying a message card containing the information of the link in an interface of the instant messaging session, the message card comprising a preview control; and in response to an operation triggering the preview control, displaying preview information of a linked object of the link without leaving the interface of the instant messaging session, wherein the linked object comprising a webpage corresponding to the link, the preview information comprising a portion of or all of information of the webpage corresponding to the link, the information of the link contained in the message card comprises an access portal constructed based on themes or summaries extracted from the webpage corresponding to the link.

\* \* \* \* \*